United States Patent [19]

Willmott et al.

[11] Patent Number: 4,716,301
[45] Date of Patent: Dec. 29, 1987

[54] DIGITAL LIGHT CONTROL

[75] Inventors: Colin B. Willmott, Buffalo Grove; Carl T. Heitschel, Oak Brook; Bernard J. Wojciak, Jr., Woodridge, all of Ill.

[73] Assignee: Chamberlain Manufacturing Corporation, Elmhurst, Ill.

[21] Appl. No.: 849,276

[22] Filed: Apr. 8, 1986

[51] Int. Cl.$^4$ .............................. G08B 1/00
[52] U.S. Cl. .......................... 307/115; 307/117; 307/140; 340/825.69; 340/825.72
[58] Field of Search ............ 307/43, 114, 115, 116, 307/117, 25, 213, 243, 241, 244, 149; 340/825.69, 825.66, 825.62, 825.70, 825.71, 825.72; 315/153, 154, 155, 156, 157, 158, 159; 455/600, 612, 603, 608; 318/45, 16, 266

[56] References Cited

U.S. PATENT DOCUMENTS

| | | | |
|---|---|---|---|
| 3,119,047 | 1/1964 | Michalski | 340/825.72 X |
| 3,337,805 | 8/1967 | Joseph | 340/825.72 X |
| 3,438,037 | 4/1969 | Leland | 340/825.72 |
| 3,891,963 | 6/1975 | Herbert | 307/149 X |
| 3,971,028 | 7/1976 | Funk | 315/159 X |
| 4,064,404 | 12/1977 | Willmott et al. | |
| 4,097,769 | 6/1978 | Wilson et al. | |
| 4,101,886 | 7/1978 | Grimes et al. | 307/140 X |
| 4,158,150 | 6/1979 | Dever | |
| 4,221,978 | 9/1980 | Smith et al. | |
| 4,223,301 | 9/1980 | Grimes et al. | 307/140 X |
| 4,255,699 | 3/1981 | Calvin | |
| 4,338,546 | 7/1982 | Ehret et al. | |
| 4,353,025 | 10/1982 | Dobkin | |
| 4,355,343 | 10/1982 | Gross | |
| 4,360,740 | 11/1982 | Conard | |
| 4,360,743 | 11/1982 | Stokes | |
| 4,369,354 | 1/1983 | Goedecke et al. | |
| 4,447,849 | 5/1984 | Harwell | |
| 4,465,956 | 8/1984 | Fowler | 307/115 X |
| 4,481,429 | 11/1984 | Christopher | |
| 4,504,778 | 12/1985 | Evans | |
| 4,523,193 | 6/1985 | Levinson et al. | 340/825.69 |
| 4,605,927 | 8/1986 | Katz et al. | 340/539 X |

Primary Examiner—William M. Shoop Jr.
Assistant Examiner—Shik Luen Paul Ip
Attorney, Agent, or Firm—Hill, Van Santen, Steadman & Simpson

[57] ABSTRACT

The present invention provides a power supply for a digital light controller which is placed in a wall box where the neutral line cannot be used. The invention uses two separate and different kinds of power supplies that are placed in series with the load and the digital light controller depends on the power supply 1 when the load is off and on the second power supply when the load is on. The supplies are alternately switched when either the remote control or a manual switch is triggered. The first power supply uses a switch that is either opened or closed to develope a voltage drop of V or 0 and the second supply uses diodes back to back to develop a voltage drop which can be stepped up and rectified to a DC voltage for powering the digital light control.

11 Claims, 2 Drawing Figures

DIGITAL LIGHT CONTROL

BACKGROUND OF THE INVENTION

1. Field of the Invention

This invention relates in general to power supplies for operating circuits under differing conditions.

2. Description of the Prior Art

Present systems require a number of three-way switch systems for operating loads and the present invention relates to a new and novel power supply system wherein two separate power supplies are utilized.

SUMMARY OF THE INVENTION

The present invention comprises a system that will provide power to a digital light control which is placed in a wall box wherein the neutral line cannot be used. The invention has been developed so it operates by using two power supplies that are placed in series with the load and the digital light control depends on the first power supply when the load is off and depends on the second power supply when the load is on. These supplies will alternate when either the remote control or a manual switch is triggered. The first power supply uses a device that is either opened or closed to develop a voltage drop of V or 0 and the second power supply produces a voltage drop across diodes connected back to back to develop a voltage drop which can then be stepped up and rectified to a DC voltage for powering the digital light control.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
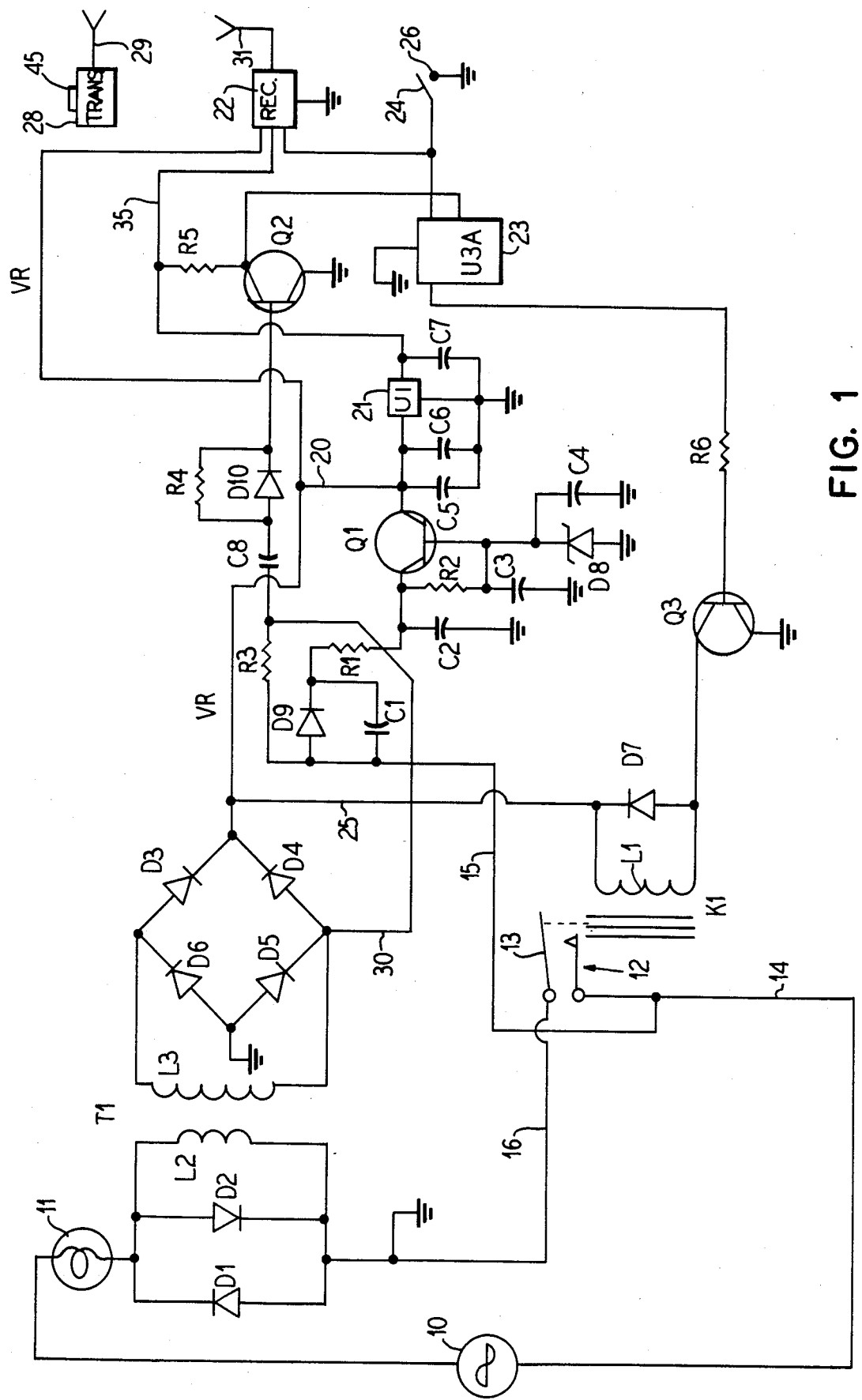
FIG. 1 is an electrical schematic of a first embodiment of the invention.

FIG. 1 illustrates a receiver 22 which has an antenna 31 which can be actuated remotely with a transmitter 28 which has an antenna 29. The receiver turns on or off a load 11 which might, for example, be a yard light or other light or any type of load. A manual switch which has a movable contact 24 and a fixed contact 26 connected to ground may also be utilized for turning on the light 11.

A power supply 10 which may be 110 volts AC has one terminal connected to one terminal of the light 11 and the other terminal of the power supply 10 is connected to lead 14 which is connected to a fixed contact 12 of a relay K1. The movable contact 13 of the relay K1 is engageable with the stationary contact 12 when the relay K1 is energized and is connected to a lead 16 which is connected to ground and also to one side of the second power supply which produces a voltage drop across back to back diodes D1 and D2 connected in parallel with the primary L2 of a transformer T1. The other side of the diodes D1 and D2 and the primary L2 are connected to the second side of the load 11. A lead 15 connects lead 14 to a diode D9 which is in parallel with the capacitor C1 which has its other side connected to a resistor R1 which is connected to a capacitor C2 which has its second side grounded and to the collector of a transistor Q1. A resistor R2 and a capacitor C3 are connected between the collector of transistor Q1 and ground. A diode D8 and capacitor C4 are connected in parallel between ground and the base of the transistor Q1 which is also connected to the junction between the resistor R2 and the capacitor C3. The emitter of transistor Q1 is connected to a lead 20 which is connected to the input of the receiver 22 to supply operating voltage VR to the receiver 22.

The secondary L3 of the transformer T1 is connected to a diode rectifier comprising the diodes D3, D4, D5 and D6 connected as shown with the junction point between diodes D5 and D6 connected to ground and the junction point between diodes D3 and D4 connected to a lead 25 and to the receiver as shown. The secondary L3 is connected across the diodes D3 and D4 as shown as well as the diodes D5 and D6 and the junction point between the diodes D5 and D4 is connected by lead 30 to the junction point between resistor R3 and capacitor C8. An oscillator circuit which operates as a clock is connected to lead 15 by resistor R3 which is connected to capacitor C8 which is connected to resistor R4 and diode D10 connected in parallel and which have their opposite side connected to the base of a transistor Q2 which has its collector connected to a triggering circuit 23. The emitter of transistor Q2 is connected to ground and a resistor R5 is connected between the collector of transistor Q2 and an eight volt supply lead 35 which is connected to the receiver 22 and also to a circuit 21 which is connected to the emitter of transistor Q1. Trigger circuit 23 supplies an output through resistor R6 to the base of a transistor Q3 which has its emitter connected to ground and its collector connected to the relay K1 winding L1 which is in parallel with the diode D7. The other sides of the relay winding L1 and diode D7 are connected to lead 25.

In operation, if the light 11 is off, the relay K1 will be unenergized and the movable contact 13 will not engage the fixed contact 12. When the light 11 is on and relay K1 is energized, the voltage across the diodes D1 and D2 would be about 1.4 volts peak to peak assuming 120 volt AC power supply for the power supply 10 and this voltage would be stepped up by transformer T1 and rectified by the back to back diodes D3 through D6. The digital light control will depend on power supply 1 which comprises the relay K1 and switch contacts 12 and 13 when the light (load) 11 is off and will depend upon the second power supply which supplies power from the diodes D1 through D6 when the bulb 11 is on. The supplies will alternate when either the remote control comprising the transmitter 28 is energized or the switch 24, 26 is closed. The first power supply comprising the switch contacts 12, 13 and the relay K1 is either opened or closed to develop a voltage drop of 120 volts or 0 volts across leads 14 and 16.

The transformer T1 has a turn ratio of 1:12 so as to step up the voltage substantially. The lead 30 is connected to the junction between resistor R3 and capacitor C8 which in combination form a delay with the transistor Q2 which provides a clock signal to the trigger circuit 23 so that relay will turn on closer to the zero crossing of the same form.

Thus, in the circuit illustrated in FIG. 1 either the transmitter 28 could be energized to turn the light 11 off or on and also the switch 24, 26 could be opened or closed to turn the light 11 off or on.

Figure 2:
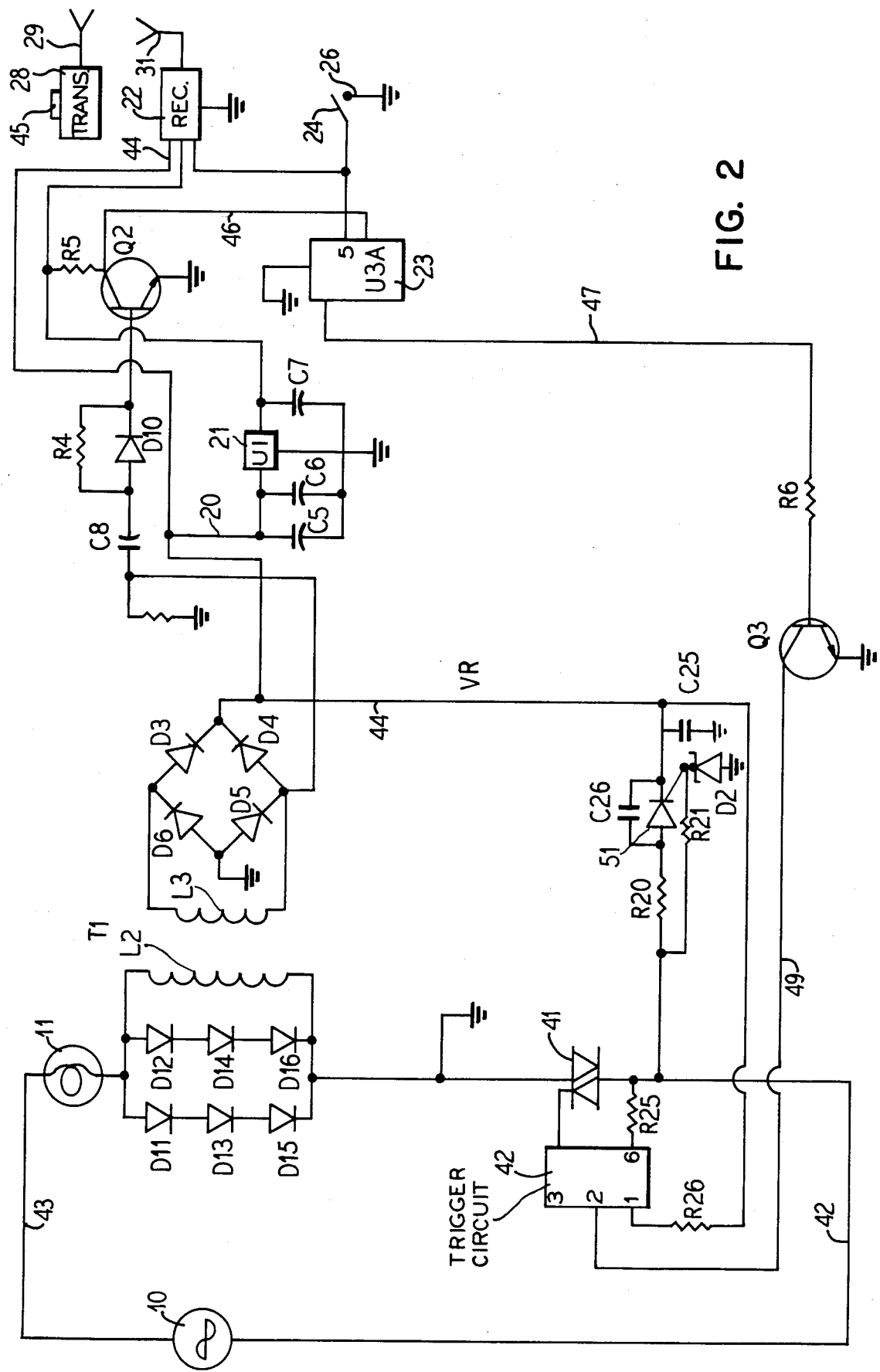
FIG. 2 is an electrical schematic of a second embodiment of the invention.

FIG. 2 illustrates a modification of the invention.

In FIG. 2 the power supply 10 is connected by one lead 42 to one side of a triac 41 which has its other side connected to ground and to one end of primary L2 of a transformer T1. The primary L2 is connected in parallel with series-parallel connected diodes D11, D13, D15 and D12, D14 and D16. The load is connected to the power supply 10 by lead 43 and has its other side connected to the primary L2 and the diodes as illustrated. A trigger circuit 42 is connected to the triac 41 and receives an input on lead 49 from the collector of transistor Q3. The ungrounded side of the triac 41 is connected to a resistor R20 which is connected to an SCR 51 which has its other side connected to lead 44 which is connected to supply power to the receiver 22. Capacitor C26 is connected in parallel with the SCR 51 and a Zener diode D21 is connected between ground and the gate of the SCR 51. A capacitor C25 is connected between ground and the SCR 51 as shown. In a practical circuit the capacitor C25 was a 330 microfarad capacitor. Capacitor C26 might be 0.001 microfarad and is connected in parallel with the SCR 51 to eliminate noise. The secondary L3 of transformer T1 is connected to the diode rectifiers D3 through D6 connected as shown and the junction point between diodes D3 and D4 is connected to lead 44 and to the receiver. The junction point between diodes D4 and D5 is connected to the clocking circuit through capacitor C8 which has its other side connected to diode D10 which is in parallel with the resistor R4. The second side of diode D10 is connected to the base of transistor Q2 which supplies from its collector, a clocking signal on lead 46 to the trigger circuit 23. Trigger circuit 23 is connected by lead 47 to the base of transistor Q3 through resistor R6 which supplies a clocking signal on lead 49 to the trigger circuit 42. The resistor R4 and capacitor C8 serve the same purpose as resistor R3 and capacitor C8 in FIG. 1.

The Zener diode D2 allows the capacitor C25 to charge to 30 volts and once 30 volts is achieved, the SCR 51 shuts off until the capacitor C25 drops below 30 volts. When this voltage drops, the SCR 51 turns back on and so forth. This regulator is very stable and is able to supply the proper current to the digital light controller. The capacitor C26 eliminates noise from the SCR 51. The interesting aspect of this circuit is that power will be used only to charge the capacitor C25 and once this capacitor is fully charged, the system turns off.

In operation, if the light is off power will be supplied to the receiver 22 through lead 44, when the receiver 22 or switch 24–26 is energized the trigger circuit 23 will cause the transistor Q3 to turn on which turns on the thyristor 41 which turns on the light 11. When the light 11 turns on, the power supply produces a voltage drop across the diodes D11 through D16 and the transformer T1 voltage VR is supplied to the receiver 22 on lead 44. Either the transmitter 28 or the switch 24 can be energized to turn the light 11 on or off and when this occurs, the first and second power supplies will alternately provide power for the receiver 22.

Although the invention has been described with respect to preferred embodments, it is not to be so limited as changes and modifications can be made which are within the full intended scope of the invention as defined by the appended claims.

We claim as our invention:

1. A power circuit for remotely or locally energizing a load, comprising, an A.C. power source, a first power supply comprising a first switching means which can be either in the opened or closed position, said A.C. power source connected to one side of said first switching means, said load with one side connected to the second side of said A.C. power source, a pair of back to back diodes connected to said A.C. power source and a transformer with its primary winding in parallel with said back to back diodes and with one side connected to the second side of said load, the second side of said first switching means and the second side of said transformer connected to ground, a transmitter, a receiver energized by said transmitter and connected to a trigger circuit, said trigger circuit connected to said first switching means to move it from an opened to a closed position, a diode rectifier connected to said receiver, a secondary winding of said transformer connected to said diode rectifier, a clock circuit connected between said trigger circuit and said first side of said A.C. power source and an amplifier circuit connected between said first side of said A.C. power source and said receiver.

2. A power circuit according to claim 1 including a manual switch connected to said trigger circuit to energize it to energize or de-energize said load.

3. A power circuit according to claim 2 wherein said first switching means is a relay.

4. A power circuit according to claim 3 wherein a first transistor is connected between said trigger circuit and said relay.

5. A power circuit according to claim 4 wherein said amplifier includes a second transistor.

6. A power circuit according to claim 5 wherein said clock circuit comprises an oscillator circuit that includes a third transistor.

7. A power circuit for remotely or locally energizing a load comprising, a receiver, an A.C. power source, a first switching means which can be in either the opened or closed condition with one side connected to one side of said A.C. power source and the second side connected to ground, a charging circuit connected between said receiver and said one side of said first switching means, one side of said load connected to the second side of said A.C. power source, the primary winding of a transformer connected between the second side of said A.C. load and ground, a plurality of diodes connected in parallel with said primary, a first trigger circuit connected to said receiver and to said first switching means, a transmitter for energizing said receiver, a diode rectifier connected to said receiver, and a secondary of said transformer connected to said diode rectifier.

8. A power circuit according to claim 7 including a manual switch connected to said first trigger circuit.

9. A power circuit according to claim 8 wherein said first switching means is a thyristor.

10. A power circuit according to claim 9 including a first transistor and a second trigger circuit connected between said first trigger circuit and said thyristor.

11. A power circuit according to claim 10 including a clock circuit connected to said first trigger circuit.

* * * * *

UNITED STATES PATENT AND TRADEMARK OFFICE
CERTIFICATE OF CORRECTION

PATENT NO. : 4,716,301

DATED : December 29, 1987

INVENTOR(S) : Willmott et al

It is certified that error appears in the above—identified patent and that said Letters Patent is hereby corrected as shown below:

Column 3, line 58, "T1 voltage" should read "T1 and voltage".

Signed and Sealed this

Twenty-fifth Day of February, 1992

Attest:

HARRY F. MANBECK, JR.

*Attesting Officer*  *Commissioner of Patents and Trademarks*